United States Patent
Kawaguchi et al.

(10) Patent No.: US 8,641,290 B2
(45) Date of Patent: Feb. 4, 2014

(54) TAPERED ROLLER BEARING

(75) Inventors: Koji Kawaguchi, Izumi (JP); Yuzuru Takahashi, Kashiwara (JP); Kiyoshi Ogino, Kashihara (JP); Hiroki Matsuyama, Nara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 1319 days.

(21) Appl. No.: 10/589,620

(22) PCT Filed: Feb. 21, 2005

(86) PCT No.: PCT/JP2005/002730
§ 371 (c)(1),
(2), (4) Date: Aug. 1, 2007

(87) PCT Pub. No.: WO2005/080813
PCT Pub. Date: Sep. 1, 2005

(65) Prior Publication Data
US 2008/0101742 A1 May 1, 2008

(30) Foreign Application Priority Data
Feb. 19, 2004 (JP) .................................. 2004-042643

(51) Int. Cl.
*F16C 19/00* (2006.01)
*F16C 33/58* (2006.01)

(52) U.S. Cl.
USPC ............................. 384/571; 384/450; 384/568

(58) Field of Classification Search
USPC ................... 384/450, 564, 565, 571, 568, 569
See application file for complete search history.

(56) References Cited

U.S. PATENT DOCUMENTS

| | | | | |
|---|---|---|---|---|
| 5,007,747 | A * | 4/1991 | Takeuchi et al. | 384/450 |
| 6,086,261 | A * | 7/2000 | Nakagawa et al. | 384/571 |
| 6,318,897 | B1 * | 11/2001 | Shitsukawa et al. | 384/450 |
| 6,328,477 | B1 * | 12/2001 | Tsujimoto et al. | 384/450 |
| 6,390,685 | B1 * | 5/2002 | Shimomura et al. | 384/568 |
| 6,447,168 | B2 * | 9/2002 | Tsujimoto et al. | 384/450 |

FOREIGN PATENT DOCUMENTS

| | | |
|---|---|---|
| JP | 54000136 A | 1/1979 |
| JP | 1991-12015 | 2/1991 |
| JP | 1992-95318 | 8/1992 |
| JP | 2003-130059 A | 5/2003 |
| JP | 2003130059 A * | 5/2003 |

OTHER PUBLICATIONS

International Search Report mailed Jun. 7, 2005 of International Application PCT/JP2005/002730.
Chinese Office Action dated Nov. 16, 2007, issued in corresponding Chinese Patent Application No. 2005800051924.
European Search Report dated Feb. 23, 2010 issued in corresponding European Patent No. 05719349.2.

* cited by examiner

*Primary Examiner* — Phillip A Johnson
(74) *Attorney, Agent, or Firm* — Westerman, Hattori, Daniels & Adrian, LLP

(57) ABSTRACT

A tapered roller bearing according to the present invention, in which the rolling surface of a tapered roller and raceway surfaces of internal and outer rings undergoes crowning. The total crowning amount of that crowning and the crowning amount of each raceway surface and rolling surface are set to preferred values. This allows reduction of the rolling friction of the internal and outer rings and the tapered roller, and the rotation torque of the tapered roller bearing according to the present invention.

2 Claims, 9 Drawing Sheets

TAPERED ROLLER BEARING

TECHNICAL FIELD

The present invention relates to a tapered roller bearing suitably used for a axle differential device, a pinion gear shaft support device for a transaxle or the like, or a transmission or the like for a vehicle or the like.

BACKGROUND ART

Recently there is growing demand for fuel efficiency of vehicles. So, it is also desired to reduce the rotation torque of a tapered roller bearing used for supporting the rotation shaft of a transmission device and a axle differential device to be mounted on those vehicles.

As a method to reduce the rotation torque of a tapered roller bearing, there is the method of reducing rolling friction by providing a crowning to the rolling surface of a tapered roller and the raceway surface of an outer/inner ring.

As such a method, for example, Japanese Unexamined Patent Publication No. 2003-130059 proposes a method to reduce rotation torque by making an raceway surface in an arc crowning shape. Japanese Unexamined Patent Publication No. 2001-65574 proposes a method to change the rolling surface of a roller and the raceway surface tangent to the rolling surface to a crowning shape similar to a logarithmic curve.

The above-mentioned conventional arts improve the performance of tapered roller bearings by specifying the shapes for the crowning of the rolling surface or the raceway surface with values. However, there have been no attempts with regard to the crowning amount and to reduce the rotation torque of the tapered roller bearing by specifying the crowning amount.

The present invention was made to resolve the above problems and has the object of providing a tapered roller bearing to reduce rotation torque by providing the rolling surface of a tapered roller and the raceway surface of an outer/inner ring with a crowning and specifying the crowning amount.

DISCLOSURE OF INVENTION

A tapered roller bearing according to the present invention is equipped with an outer ring having an outer ring raceway surface undergoing crowning, an inner ring having an inner ring raceway surface undergoing crowning and a rolling surface undergoing crowning and in addition, plural tapered rollers located as rolling universally between said outer and inner ring raceway surfaces; wherein the total crowning amount (crowning amount of outer ring+crowning amount of inner ring+crowning amount of roller×2) is 50 µm or more, the crowning ratio of the outer ring (crowning amount of outer ring/total crowning amount) is 40% or more and the roller crowning ratio (=(roller crowning amount×2)/total crowning amount) is 20% or less.

In a tapered roller bearing composed as above, the total crowning amount, outer ring crowning ratio, and roller crowning ratio of crowning that the rolling surface of said tapered roller and the raceway surfaces of the internal/outer rings undergo is set to preferred values, which can reduce rolling viscosity resistance between the internal/outer rings and the tapered roller as well as appropriately reducing the respective contact areas on the rolling surface and the raceway surface. Accordingly, it is possible to reduce this rolling friction and the rotation torque of the tapered roller bearing.

In the above-mentioned tapered roller bearing, it is preferable that the crowning ratio of the inner ring (the crowning amount of inner ring/total crowning amount) be 10% or more.

In this case, it is possible to reduce contact load in the vicinity of both of the axial ends on a contact surface between said inner ring raceway surface and said rolling surface. Even in so-called edge load operations, this system allows the operation to be reduced and prevents service life of the bearing from being shortened.

BEST MODES FOR CARRYING OUT THE INVENTION

Figure 1:
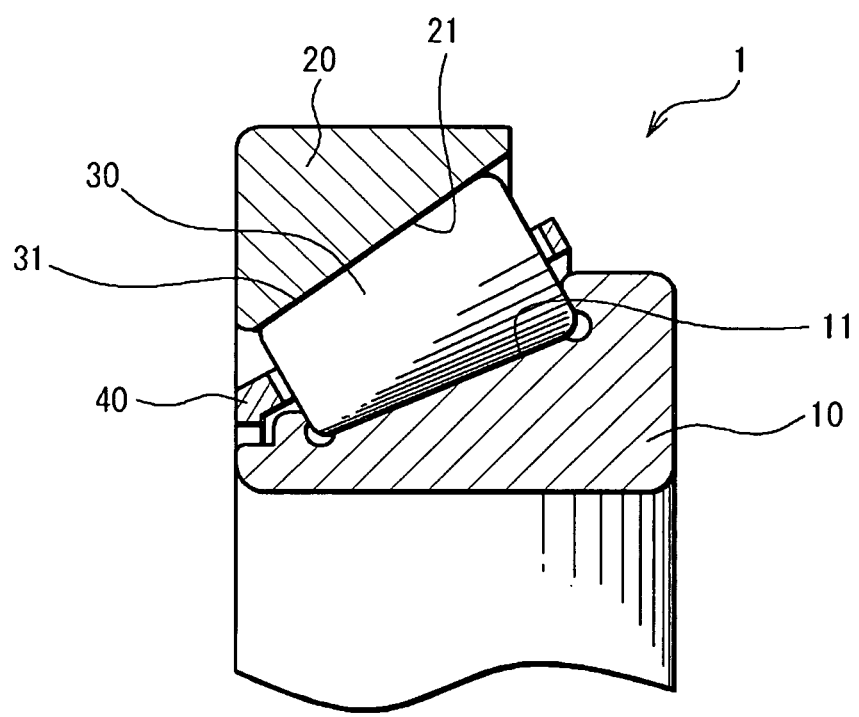
FIG. 1 is an axial cross-sectional view showing a tapered roller bearing embodying the present invention.

Next, the present invention will be described below based on a preferred embodiment with reference to the attached drawings. FIG. 1 is an axial cross-sectional view showing a tapered roller bearing embodying the present invention.

In this drawing, the tapered roller bearing 1 according to the present embodiment is equipped with an inner ring 10 with an inner ring raceway surface 11 comprising a conical surface at an outer peripheral part, an outer ring 20 with an outer ring raceway surface 21 comprising a conical surface at an inner peripheral part, plural tapered rollers 30 having a rolling surface 31 comprising a conical surface at an outer peripheral part, which is located so as to roll between both raceway surfaces 11 and 21, and a retainer 40 having plural tapered rollers 30 at a predetermined interval in a circumferential direction. In addition, the inner ring raceway surface 11, the outer ring raceway surface 21 and the rolling surface 31 undergo crowning, which is the characteristic feature of the present invention.

Figure 2A:
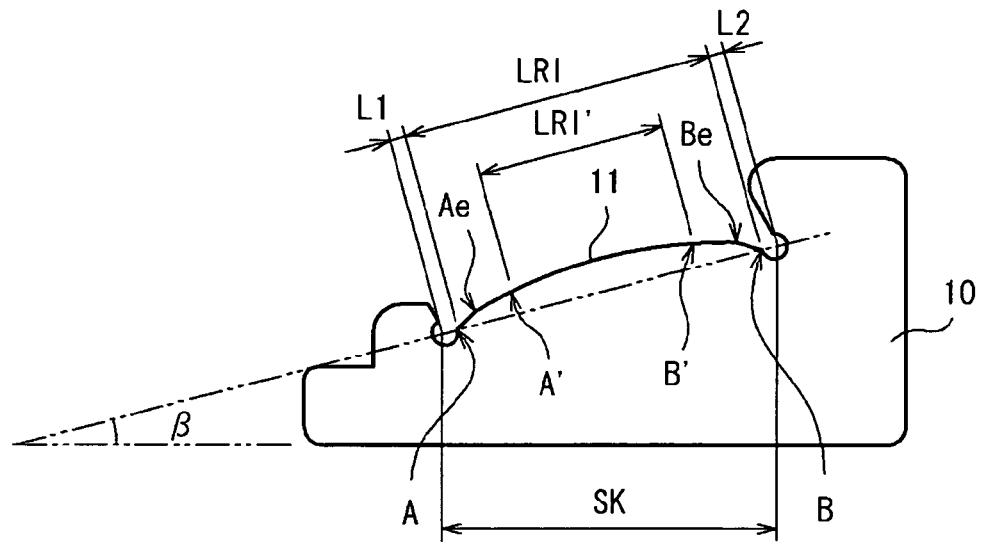
FIG. 2 is views showing the shape of a crowning of an inner ring (in case of multi-crowning), in which FIG. 2 (a) shows the contour of the inner ring and FIG. 2 (b) schematically shows the shape of the crowning undergone by the raceway surface of the inner ring.
Figure 2B:
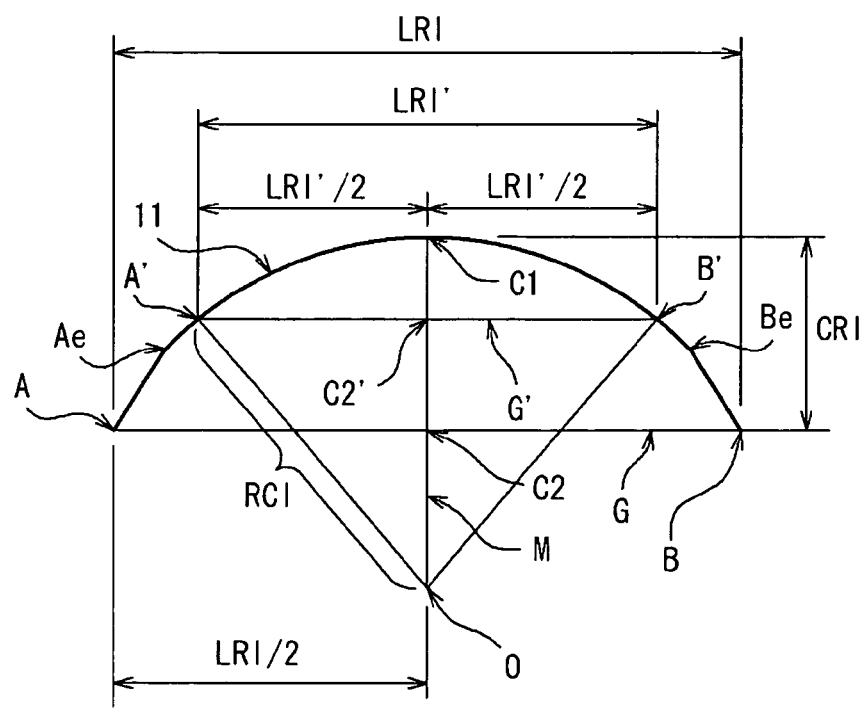

The concept of general crowning is hereinafter described with reference to an example of the inner ring. FIG. 2 (a) is a view exaggerating the contour of a cross-sectional view in an axial direction of the inner ring 10 whose inner ring raceway surface 11 has undergone crowning. In the drawing, the inner ring raceway surface 11 which rolls while contacting the rolling surface 31 of the tapered roller 30, undergoes crowning which protrudes slightly outward in a radial direction. This crowning is a trapezoidal multi-crowning whose circular arc is an upper base.

A calculation method of the crowning amount of the inner ring 10 (hereinafter referred to as "inner ring crowning amount") is hereinafter described. In FIG. 2 (a), when the width of the inner ring raceway surface 11 to the inner ring 10 in an axial direction is determined as SK, a taper angle of the inner ring raceway surface 11 is determined as β, chamfering dimensions formed at both ends of the inner ring raceway surface 11 shown in the drawing are determined as L1 and L2, an raceway length LRI is obtained by the following equation (1).

$$LSI = SK/\cos\beta - (L1 + L2) \tag{1}$$

Here, by taking a length LRI', with LRI' equal to 0.6 LRI from the middle point of an raceway length LRI as shown in the drawing, points on the inner ring raceway surface 11 corresponding to the dimensional ends of the LRI' are determined as numerals A' and B'. In addition, in this case, numerals A' and B' are located inside of end points Ae and Be on a circular arc; however, numerals A' and B' may be aligned with end points Ae and Be on the circular arc.

FIG. 2 (b) schematically shows a cross-sectional shape of the crowning between the end points A and B of the raceway length LRI of the inner ring raceway surface 11 shown in FIG. 2 (a). In FIG. 2 (b), a straight line M passing through a center point C2' of a chord G' of a crowning on the length LRI' and a center O of a circular arc of a crowning runs at right angles to a chord G' and passes through the center point C1 of a crowning circular arc on the length LRI'. In addition, the distance dimension from the center point C1 of this crowning circular arc to the center point C2 of the crowning chord G on the raceway length LRI is determined as a crowning amount CRI of the inner ring 10.

In addition, the shape of the crowning of the inner ring may be not only a trapezoidal shape whose circular arc is an upper base shown in FIG. 2 but also a single circular arc shape, a shape comprising plural circular arcs, logarithmic crowning, elliptic crowning, and all types of crowning shapes. The above-mentioned concept regarding crowning amount is applicable to all these types of crowning shapes.

In addition, the above-mentioned concept of the crowning is also applicable to the roller and outer ring. Furthermore, the definition of the above-mentioned crowning amount is also applicable to the roller and outer ring. Crowning composed by combination of plural shapes in the range of the raceway length (length of the rolling surface) is referred to as a multi-crowning, and crowning composed by single circular arc shape in the range of the raceway length is referred to as full crowning.

Next, a concept of the crowning in the case that a shape of the crowning is a full crowning and a concept of the crowning amount based on that are described hereinafter. As the same time, concepts of the crowning on a tapered roller and an outer ring are also described hereinafter.

Figure 3A:
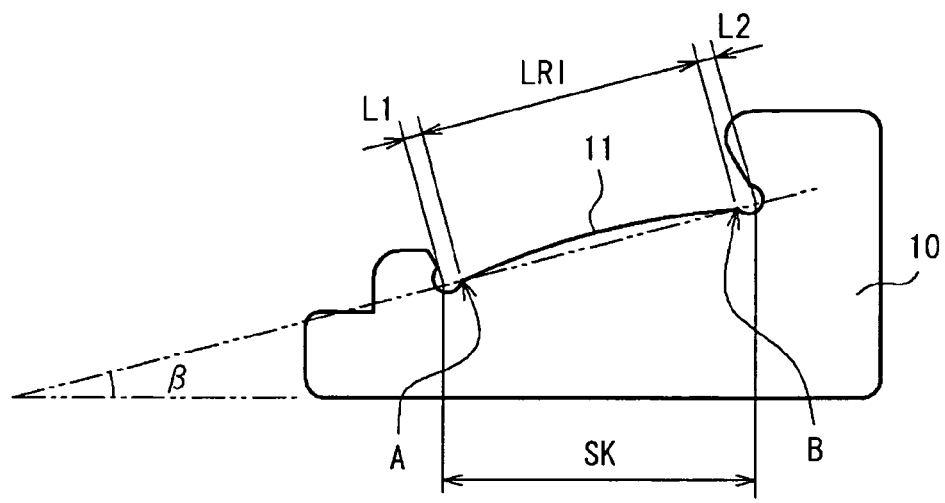
FIG. 3 is views showing the shape of a crowning of an inner ring (in case of full crowning), in which FIG. 3 (a) shows the contour of the inner ring and FIG. 3 (b) schematically shows the shape of the crowning undergone by the raceway surface of the inner ring.
Figure 3B:
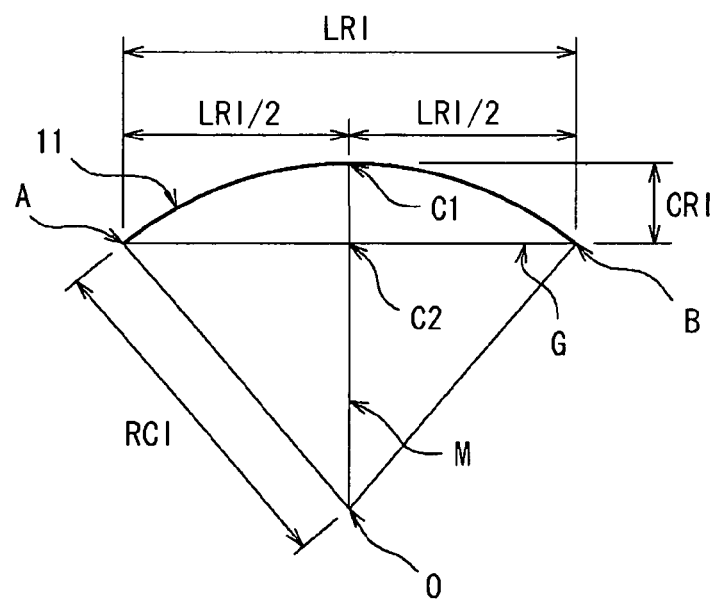

FIG. 3 (a) is a view showing a contour on the cross-sectional view in the axial direction of the inner ring 10 whose inner ring raceway surface 11 has undergone full crowning. In the drawing, the raceway length LRI is obtained as follows in the same manner as the equation (1) in FIG. 2 (a).

$$LRI = SK/\cos\beta - (L1 + L2)$$

Meanwhile, FIG. 3 (b) schematically shows a cross-sectional shape of the crowning between end point A and end point B of the raceway length LRI on the inner ring raceway surface 11 shown in FIG. 3 (a). In the drawing, a straight line M passing through the center point C2 of a chord G of a crowning on the raceway length LRI and a center O of a circular arc of a crowning runs at right angles to a chord G and passes through a center point C1 of a crowning circular arc on the raceway length LRI. In addition, a distance dimension from the center point C1 of this crowning circular arc to the center point C2 of the crowning circular arc was determined as a crowning amount CRI of the inner ring. That is, if the radius of the crowning circular arc is determined as RCI as shown in the drawing, the crowning amount CRI of the inner ring is obtained by the following equation (2).

$$CRI = RCI - \{RCI^2 - (LRI/2^2)\}^{1/2} \tag{2}$$

Figure 4A:
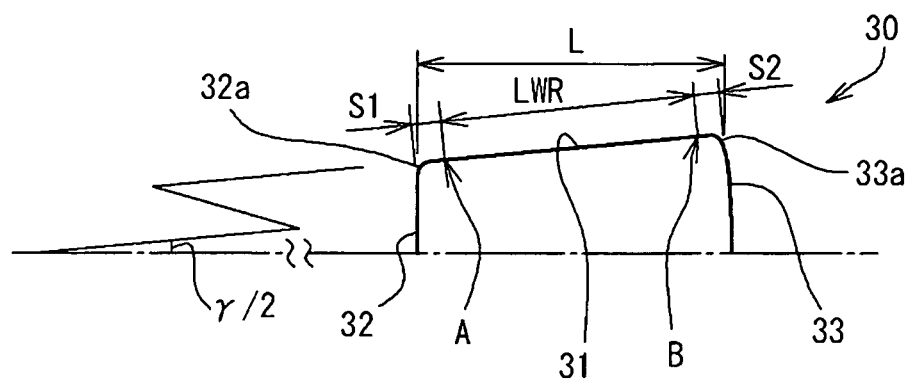
FIG. 4 is views showing the shape of a crowning of the tapered roller, in which FIG. 4 (a) shows the contour on the upper part of the axial cross-sectional view of the tapered roller 30 and FIG. 4 (b) schematically shows the shape of the crowning undergone by the rolling surface of the tapered roller.
Figure 4B:
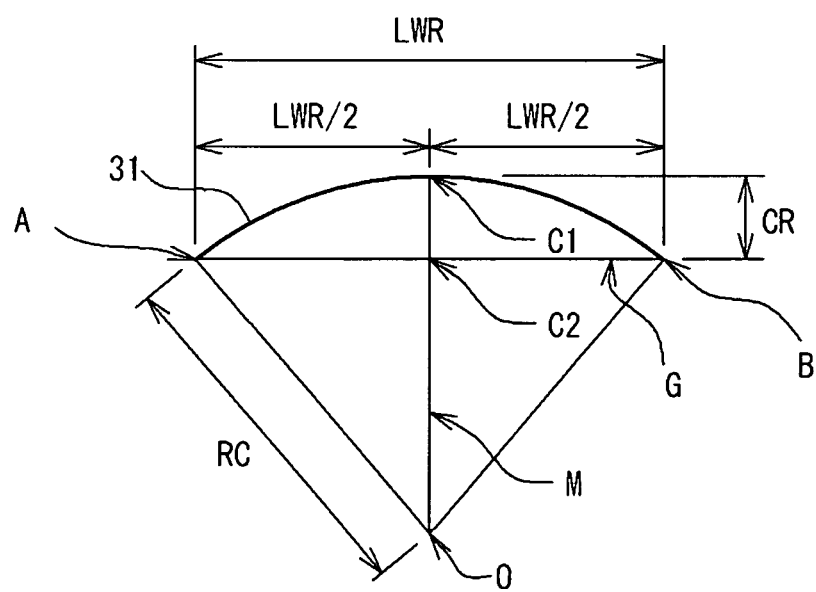

FIG. 4 (a) is a view showing a contour on the upper part of the axial cross-sectional view of the tapered roller 30. In the drawing, the tapered roller 30 is provided with a rolling surface 31 which rolls while in contact with raceway surfaces 11 and 21 of the internal and outer rings. In addition, the both ends of the rolling surface 31 are provided respectively with chamfering parts 32a and 33a, which are designed to be smoothly led to the small-diameter side end surface 32 and the large-diameter side end surface 33 of tapered roller 30. In addition, the rolling surface 31 undergoes full crowning which slightly protrudes in an outer diameter direction.

A calculation method of the crowning amount of the tapered roller 30 (hereinafter referred to as "roller crowning amount") is hereinafter described. In FIG. 4 (a), when the width of the rolling surface 31 of the tapered roller 30 in the center axial direction is determined as L, the taper angle of the rolling surface 31 is determined as γ, the residual width dimensions after curved surfaces of chamfering parts 32a and 33a formed at both ends of the rolling surface 31 are removed from the whole width of the rolling surface are determined as S1 and S2, the above-mentioned effective length LWR is obtained by the following equation (3).

$$LWR = L/\cos(\gamma/2) - (S1 + S2) \tag{3}$$

In the above equation (3), constant numbers for S1 and S2 can be determined depending on the size of a bearing.

FIG. 4 (b) schematically shows the shape of the crowning between the end points A and B of the roller effective length LWR of the rolling surface 31 shown in FIG. 4 (a). In the drawing, a straight line M passing through the center point C2 of a chord G of a crowning on the roller effective length LWR and the center O of the circular arc of a crowning runs at right angles to a chord G and passes through the center point C1 of a crowning circular arc on the roller effective length LWR. The inventors of the present invention determined a distance dimension from the center point C1 of this crowning circular arc to the center point C2 of the crowning circular arc as a roller crowning amount CR. In addition, if the radius of the crowning circular arc is determined as RC as shown in the drawing, the roller crowning amount CR is obtained by the following equation (4).

$$CR = RC - \{RC^2 - (LWR/2^2)\}^{1/2} \tag{4}$$

Figure 5A:
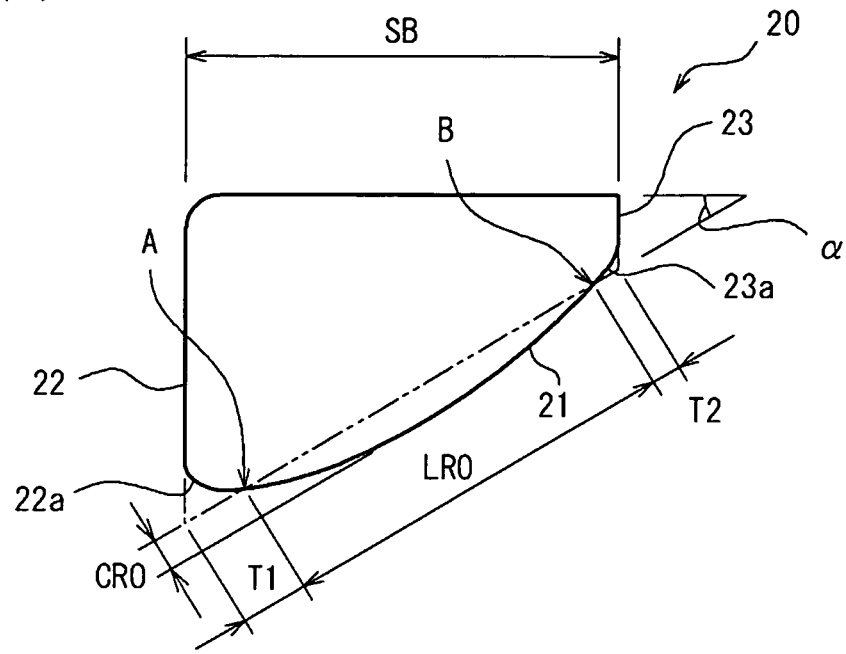
FIG. 5 is views showing the shape of a crowning of an outer ring, in which FIG. 5 (a) shows the contour of an outer ring and FIG. 5 (b) schematically shows the shape of a crowning undergone by the raceway surface of an outer ring.
Figure 5B:
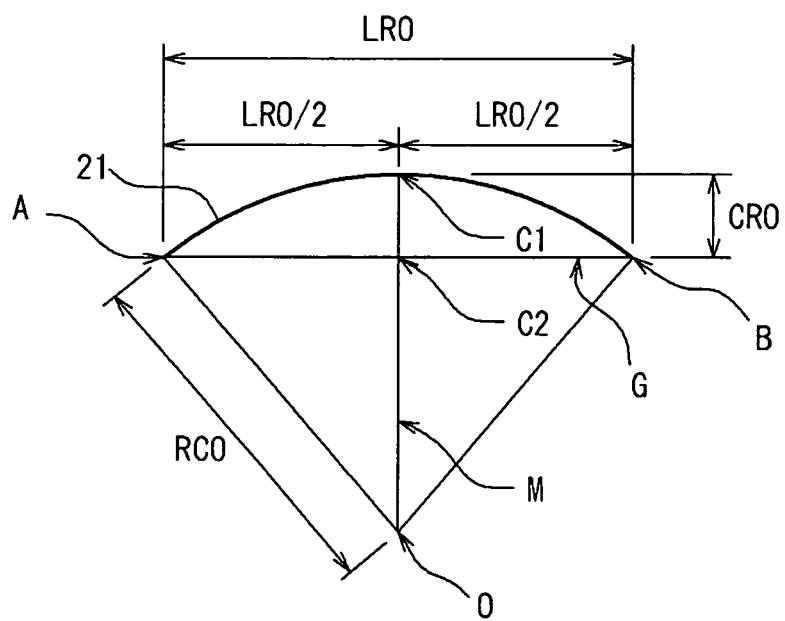

Next, the calculation method of the crowning amount of the outer ring 20 whose raceway surface underwent full crowning (hereinafter referred to as "outer ring crowning amount") is described. FIG. 5 (a) is a view exaggerating the contour on a cross-section view in an axial direction of the outer ring 20 whose outer ring raceway surface 21 has undergone full crowning. In the drawing, the outer ring raceway surface 21, which rolls while in contact with the rolling surface 31 of the tapered roller 30, has undergone arc-shaped crowning in cross-section which protrudes inward in a radial direction. In addition, the both ends of the outer ring raceway surface 21 and the axial end surface of the outer ring 20 are provided respectively with chamfering parts 22a and 23a. These chamfering parts 22a and 23a are designed to be smoothly led to a small-diameter side end surface 22 and a large-diameter side end surface 23 of the outer ring 20.

In FIG. 5 (a), when the width of the outer ring raceway surface 21 of the outer ring 20 in the axial direction is determined as SB, the taper angle of the outer ring raceway surface 21 is determined as a, the residual width dimension after curved surfaces of chamfering parts 22a and 23a formed at both ends of the outer ring raceway surface 21 are removed from the whole width of the outer ring raceway surface are determined as T1 and T2, the above-mentioned raceway length LRO is obtained by the following equation (5).

$$LRO = SB/\cos\alpha - (T1+T2) \tag{5}$$

In the above equation (5), constant numbers can be determined as T1 and T2 depending on a size of a bearing.

FIG. 5 (b) schematically shows a cross-sectional shape of the crowning between the end points A and B of the raceway length LRO of the outer ring raceway surface 21 shown in FIG. 5 (a). In the drawing, a straight line M passing through the center point C2 of a chord G of a crowning on the raceway length LRO and the center O of a circular arc of a crowning runs at a right angle to chord G and passes through the center point C1 of a crowning circular arc on the raceway length LRO. The inventors of the present invention determined a distance dimension obtained by the center point C1 of this crowning circular arc and the center point C2 of the crowning circular arc as the outer ring crowning amount CRO. In addition, if the radius of the crowning circular arc is determined as RCO, as shown in the drawing, the outer ring crowning amount CRO is obtained by the following equation (6).

$$CRO = RCO - \{RCO^2 - (LRO/2^2)\}^{1/2} \tag{6}$$

As mentioned above, the crowning amount of the tapered roller and internal and outer rings to undergo full crowning can be obtained.

In addition, for the tapered roller 30 and internal and outer rings 10 and 20 to undergo full crowning, it is obvious that the crowning amount can be calculated based on the above-mentioned general concept regarding crowning. That is, in the same manner as obtaining the length LRI' in FIG. 2, in the case of the tapered roller 30, the LWR' to the LWR, in case of the outer ring 20, the LRO' to the LRO can be calculated respectively. Thus, the crowning amount based on the general crowning concept almost matches the amount obtained based on the full crowning concept (FIG. 4 and FIG. 5).

In addition, the inventors of the present invention obtained the total crowning amount, outer ring crowning ratio, roller crowning ratio and inner ring crowning ratio from the above-mentioned roller crowning amount, inner ring crowning amount and the outer ring crowning amount based on the following equations (7), (8), (9) and (10).

Total crowning amount=outer ring crowning amount+ inner ring crowning amount+roller crowning amount×2 (7)

Outer ring crowning ratio=outer ring crowning amount/total crowning amount (8)

Roller crowning ratio=roller crowning amount×2/ total crowning amount (9)

Inner ring crowning ratio=inner ring crowning amount/total crowning amount (10)

In addition, for the tapered roller 30 and the internal/outer rings 10 and 20 according to the tapered roller bearing 1 of the present embodiments, the total crowning amount is set to 50 µm or more, the outer ring crowning ratio is set to 40% or more, and the roller crowning ratio is set to 20% or less.

The result of the verification test conducted by the inventors to clarify the relationship between the rotation torque of the tapered roller bearing, the total crowning amount and each crowning ratio is hereinafter described. For the tapered roller bearings used for this test, many tapered roller bearings (JIS30306 equivalent) composed as shown in FIG. 1, in which the total crowning amount and each crowning ratio were set to various values, were prepared to experimentally measure their rotation torque.

As a method to measure the rotation torque of tapered roller bearings, after mounting the tapered roller bearings according to examples to a bearing test device, for example using the bearing test device, by rotating either of the inner ring or outer ring, the rotation torque affecting another wheel was measured. As test conditions, gear oil for axle differential devices was used as lubrication oil, axial load 4 kN was applied as dummy pressurized load and the rotation speed was set to 2 speeds of 300 rpm and 2000 rpm.

In addition, in case the rotation speed was 300 rpm, the lubrication condition was employed in which only an appropriate amount of lubrication oil at normal temperature was applied before the test and the test was continuously conducted without lubrication. In the case in which the rotation speed was 2000 rpm, the test was conducted while lubrication oil at 323 K (50° C.) was supplied in circulation at 0.5 liter per minute. The method of supplying lubrication oil was different so that the effect of agitating resistance of lubrication oil, which occurs when lubrication oil is excessively supplied, could be reduced as much as possible to extract rotation torque due to rolling friction by supplying the minimum necessary amount of lubrication oil according to each rotation speed.

As described above, the rotation torque for each tapered roller bearing whose total crowning amount and each crowning ratio are set to various values was measured. In addition, by grasping the relationship between said total crowning amount, each crowning ratio and rotation torque, the range of values in which the rotation torque would be reduced was identified.

Figure 6:
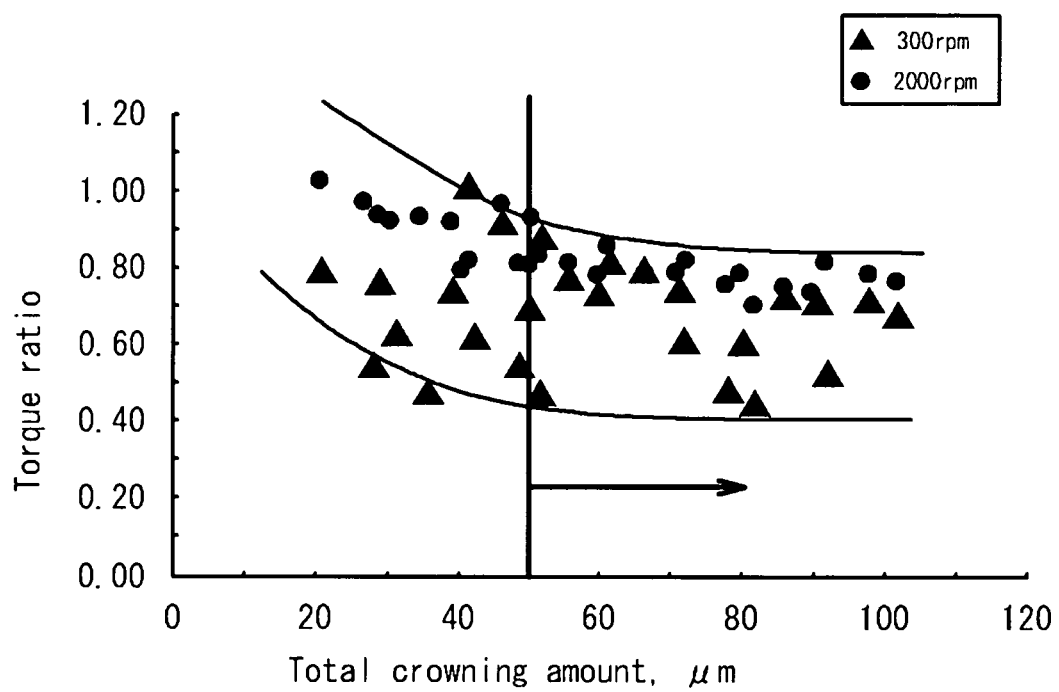
FIG. 6 is a scatter diagram showing the relationship between total crowning amount and the torque ratio of a tapered roller bearing.

FIG. 6 is a scatter diagram showing the relationship between total crowning amount and the measured torque ratio of the tapered roller bearing (rotation torque/predetermined value) The drawing clearly shows that when total crowning amount is 50 µm or less, the torque ratio scatters widely, however the maximum value among the scattering torque ratios tends to decrease gradually as the total crowning amount increases. The drawing also shows that when the total crowning amount is 50 µm or more, the torque ratio stably scatters in a lower-value range in comparison with the case where the total crowning amount is 50 µm or less.

In addition, if the above-mentioned total crowning amount exceeds 100 µm, the tapered roller and internal and outer rings will undergo an excessive amount of crowning, possibly causing the tapered roller not to be stably rolled. Accordingly, the total crowning amount is preferably 100 µm or less.

Figure 7:
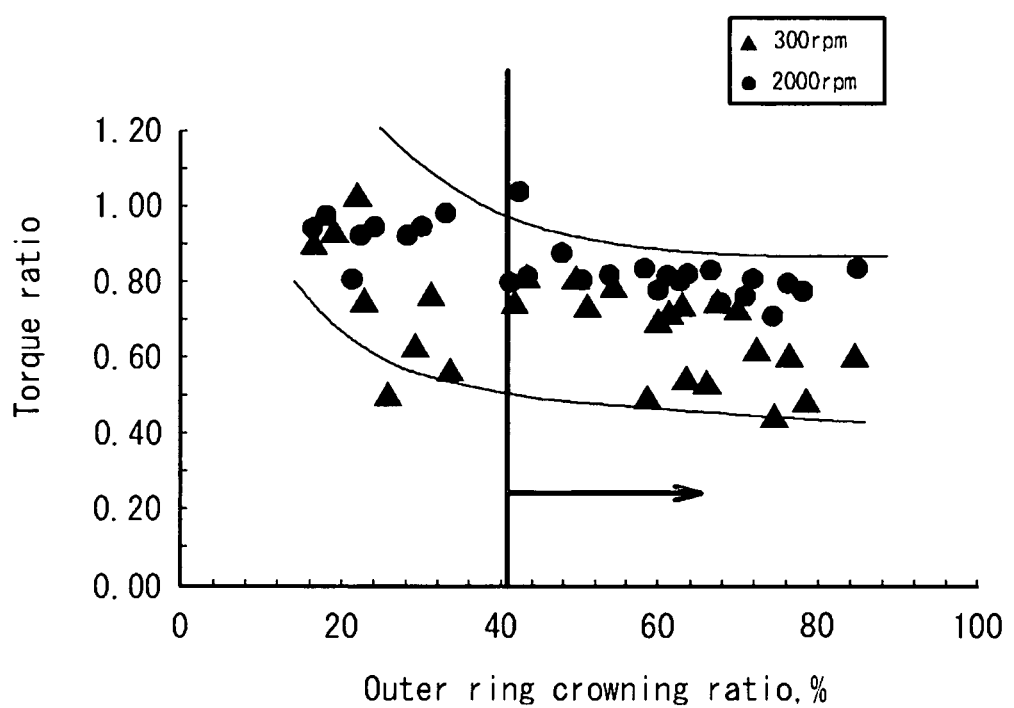
FIG. 7 is a scatter diagram showing the relationship between an outer ring crowning ratio and the torque ratio of a tapered roller bearing.

Next, FIG. 7 is a scatter diagram showing the relationship between the outer ring crowning ratio and the torque ratio of the tapered roller bearing. This drawing clearly shows that when the outer ring crowning ratio is 40% or less, the maximum value among the torque ratios tends to decrease gradually as the outer ring crowning ratio increases, and when the outer ring crowning ratio is 40% or more, the torque ratio stably scatters in a lower-value range compared with the case in which the outer ring crowning ratio is 40% or less.

Figure 8:
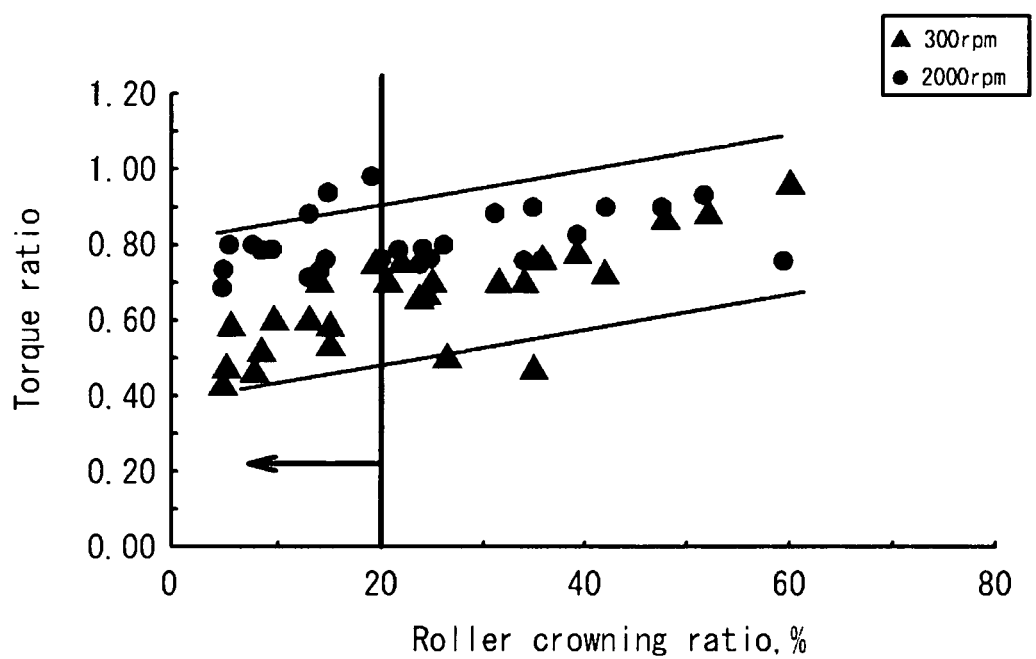
FIG. 8 is a scatter diagram showing the relationship between a roller crowning ratio and the torque ratio of a tapered roller bearing.

FIG. 8 is a scatter diagram showing the relationship between the roller crowning ratio and the torque ratio of the tapered roller bearing. This drawing clearly shows that when the roller crowning ratio is 20% or more, the maximum value among the torque ratios tends to decrease gradually as the roller crowning ratio decreases, and when the roller crowning ratio is 20% or less, the torque ratio stably scatters in a lower-value range in comparison with the case where the roller crowning ratio is 20% or more.

Figure 9:
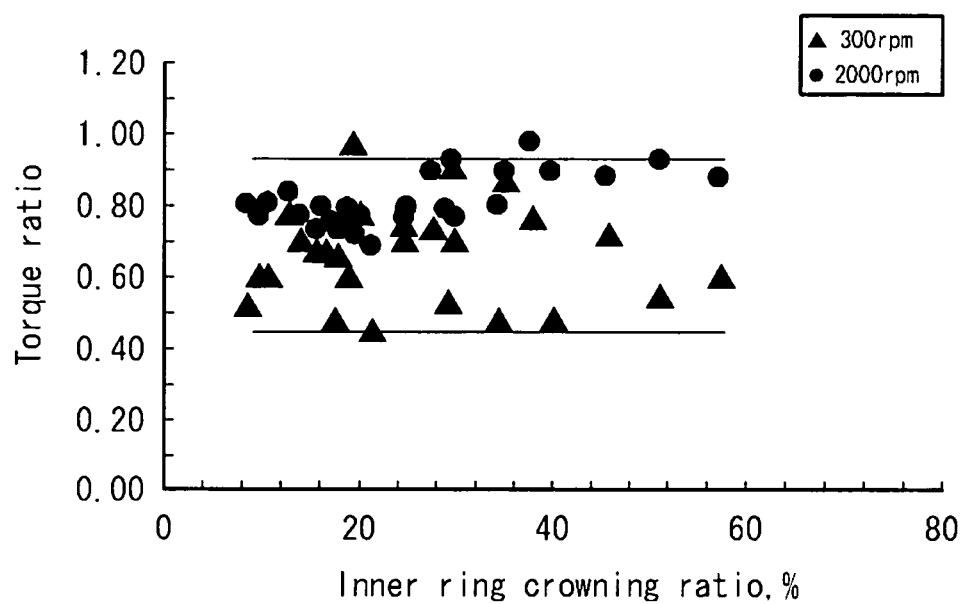
FIG. 9 is a scatter diagram showing the relationship between an inner ring crowning ratio and a torque ratio of a tapered roller bearing.

FIG. 9 is a scatter diagram showing the relationship between the inner ring crowning ratio and the torque ratio of the tapered roller bearing. This drawing clearly shows that the torque ratio stably scatters in a defined area to the change in crowning ratio of the inner ring. That is, the inner ring crowning ratio did not have a significant relationship with the torque ratio of the tapered roller bearing. However, by setting the inner ring crowning ratio to 10% or more, the contact load in the vicinity of axial both ends on the contact surface between the inner ring raceway surface 11 and rolling surface 31 can be reduced. This enables the effect to be relieved even if a so-called edge load is generated and prevents the service life of the aforementioned bearing from being shortened.

As mentioned above, as a result of experimentally measuring and verifying the relationship between the rotation torque ratio of the tapered roller bearing, that is, the rotation torque, and the total crowning amount and each crowning ratio, it was confirmed that the rotation torque of the tapered roller bearing decreases provided that the total crowning amount is 50 μm or more, the outer ring crowning ratio is 40% or more and the roller crowning ratio is 20% or less.

In addition, although the outer ring crowning ratio may be 100%, it is preferably 90% or less, considering that the inner ring crowning ratio is undertaken at 10% or more as mentioned above. When the roller crowning ratio is 0%, if the outer ring crowning ratio and inner ring crowning ratio are within the above-mentioned predetermined range, the reduction effect on rotation torque will be obtained. Accordingly, the roller crowning ratio just has to be set to 0% through 20%.

In addition, the inner ring crowning ratio is preferably 60% or less since the outer ring crowning ratio is undertaken at 40% or more.

During the above-mentioned verification test, the rotation torque of the measured tapered roller bearing was measured on the condition that effect by agitating resistance of lubrication oil was eliminated as much as possible, and the rolling viscosity resistance between the tapered roller and the internal and outer rings was significantly affected.

That is, from the results of the above verification test, it is assumed that if the total crowning amount of each crowning for the rolling surface of the tapered roller 30 and the raceway surfaces of internal and outer rings, the outer ring crowning ratio and the roller crowning ratio respectively are set as above mentioned, the rolling viscosity resistance will be reduced.

That is, in the tapered roller bearing 1 according to present embodiments, as above mentioned, the rolling viscosity resistance between the tapered roller 30 and the internal and outer rings 10 and 20 can be reduced and those rolling frictions can also be reduced. As a result, the rotation torque of the tapered roller bearing 1 can be reduced.

Particularly, since in the pinion gear shaft support devices for vehicles, such as axle differential devices, the bearings are lubricated by comparatively-high viscosity gear lubricant oil, the rolling viscosity resistance of the bearings used for the above-mentioned devices tends to become higher.

Accordingly, using the tapered roller bearing according to the present invention for the pinion gear shaft support device achieves magnificent effects of the rotation torque reduction remarkably.

In addition, in order to verify the reduction effect in the rotation torque of the tapered roller bearing according to present embodiments, the inventors of the present invention measured the rotation torque using the example and comparative example. As the example according to the present invention, a tapered roller bearing in which the total crowning amount is set to 64 μm, the outer ring crowning amount is set to 40 μm, the roller crowning amount is set to 2 μm and the inner crowning amount is set to 20 μm was used. In the tapered roller bearing according to the present example, the outer ring crowning ratio is determined as 62.5%, the roller crowning ratio is determined as 6.25%, and the inner ring crowning ratio is determined as 31.25%. As a comparative example, a tapered roller bearing of the same size of as that of the example, and whose internal and outer rings and tapered roller did not undergo crowning was prepared. The rotation torque of the example and comparative example were measured under the same conditions to compare the data of each.

As a result, in the tapered roller bearing according to the above-mentioned example, it was confirmed that the rotation torque can be reduced by approximately 55% in comparison with the tapered roller bearing for comparative example.

In addition, the tapered roller bearing according to the present invention is not limited to each embodiment above mentioned but the composition of the bearing and shapes of the rolling surface of the tapered roller and the raceway surface of the internal and outer rings can be changed according to the concept of the present invention as required.

FIG. 1
FIG. 2
FIG. 3
FIG. 4
FIG. 5
FIG. 6
(1) Torque ratio
(2) Total crowning amount
FIG. 7
(1) Torque ratio
(2) Outer ring crowning ratio
FIG. 8
(1) Torque ratio
(2) Roller crowning ratio
FIG. 9
(1) Torque ratio
(2) Inner ring crowning ratio

What is claimed is:
1. A tapered roller bearing comprising:
an outer ring having an outer ring raceway surface undergoing crowning;
an inner ring having an inner ring raceway surface undergoing crowning; and
plural tapered rollers having a rolling surface undergoing crowning, which are located as rolling universally between said outer and inner ring raceway surfaces, wherein the total crowning amount, defined as the sum of crowning amount of outer ring, the crowning amount of inner ring and two times the crowning amount of the roller, is more than 50 μm, the crowning ratio of the outer ring, defined as crowning amount of outer ring divided by the total crowning amount, is 40% or more, and the roller crowning ratio, defined as two times the roller crowning amount divided by the total crowning amount, is 20% or less.

2. The tapered roller bearing is according to claim 1, wherein the inner wheel crowning ratio, defined as crowning amount of the inner ring divided by the total crowning amount, is 10% or more.

* * * * *

UNITED STATES PATENT AND TRADEMARK OFFICE
CERTIFICATE OF CORRECTION

PATENT NO. : 8,641,290 B2
APPLICATION NO. : 10/589620
DATED : February 4, 2014
INVENTOR(S) : Kawaguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1577 days.

Signed and Sealed this
Twenty-second Day of September, 2015

Michelle K. Lee
*Director of the United States Patent and Trademark Office*